United States Patent
Bender et al.

(10) Patent No.: US 8,634,812 B1
(45) Date of Patent: Jan. 21, 2014

(54) PHONEWORD DIALING IN A MOBILE COMMUNICATION DEVICE HAVING A FULL KEYBOARD

(75) Inventors: Michael John Bender, Waterloo (CA); Donald Somerset McCulloch McKenzie, Waterloo (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 13/541,985

(22) Filed: Jul. 5, 2012

(51) Int. Cl.
*H04M 3/42* (2006.01)

(52) U.S. Cl.
USPC .............. 455/414.1; 455/418; 455/550.1; 715/261

(58) Field of Classification Search
USPC ............ 455/414.1, 418, 550.1; 715/261
See application file for complete search history.

(56) References Cited

U.S. PATENT DOCUMENTS

| | | | |
|---|---|---|---|
| 2003/0023420 A1* | 1/2003 | Goodman | 704/1 |
| 2004/0018857 A1 | 1/2004 | Asokan | |
| 2006/0271522 A1* | 11/2006 | Scott et al. | 707/3 |
| 2007/0123235 A1 | 5/2007 | Newport et al. | |
| 2008/0317240 A1 | 12/2008 | Chang et al. | |
| 2009/0043915 A1* | 2/2009 | Scott et al. | 710/8 |
| 2009/0154682 A1 | 6/2009 | Qiu | |
| 2009/0258634 A1* | 10/2009 | Amine | 455/413 |
| 2010/0054446 A1 | 3/2010 | Braun | |
| 2010/0093404 A1 | 4/2010 | Baek | |
| 2010/0146386 A1* | 6/2010 | Ma et al. | 715/261 |
| 2011/0086622 A1* | 4/2011 | Chu | 455/414.1 |

FOREIGN PATENT DOCUMENTS

| | | |
|---|---|---|
| EP | 1993270 | 11/2008 |
| WO | 2008052119 | 5/2008 |

OTHER PUBLICATIONS

Research in Motion Ltd., "Blackberry Bold 9900/9930 User Guide Version 7.1", Retrieved from the Internet: URL:http://docs.blackberry.com/en/smartphone_users/deliverables/38352/BlackBerry_Bold_Series-User_Guide--1817681-0105101203-001-7.1-US.pdf, May 15, 2012, pp. 60-64.
European Patent Application No. 12175161.4, Extended European Search Report dated Nov. 22, 2012.

\* cited by examiner

*Primary Examiner* — Danh Le
(74) *Attorney, Agent, or Firm* — Steven M. Greenberg, Esq.; Carey, Rodriguez, Greenberg & O'Keefe

(57) ABSTRACT

A method of dialing a phoneword using a mobile communication device that has full keyboard, which maps numbers to letters differently than on standard telephone keypads. The method detects the prefix of the phoneword and proceeds to display a message on the mobile communication device to indicate that a pre-determined key needs to be pressed before entering letters of the phoneword. The method can also display for selection, candidate phonewords that correspond to a partial entry of the phoneword.

30 Claims, 9 Drawing Sheets

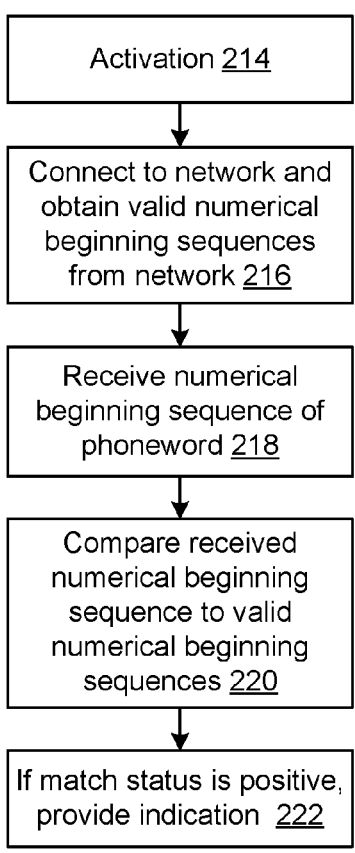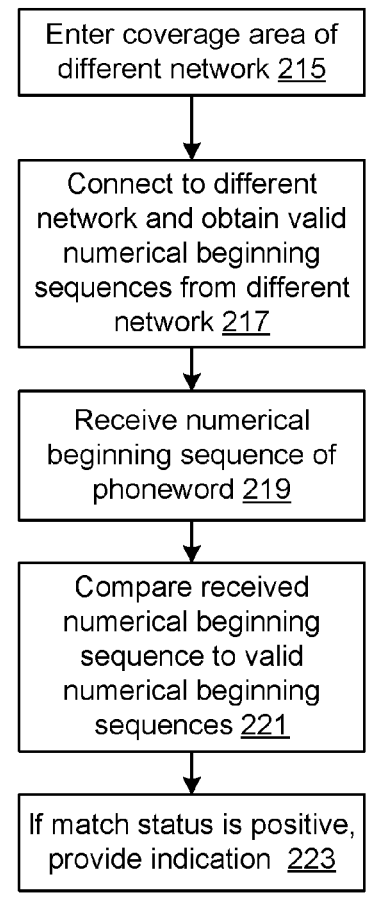
Figure 5A
Figure 5B

PHONEWORD DIALING IN A MOBILE COMMUNICATION DEVICE HAVING A FULL KEYBOARD

FIELD

The present disclosure relates generally to mobile communication devices having a full physical keypad. More particularly, the present disclosure relates to dialing phonewords using the full physical keypad.

BACKGROUND

Mobile communication devices that have a full physical keypad are popular for the ease of typing they provide. However, as full physical keypads do not generally have number keys marked with the same letter pattern as in standard telephone keypads, using the full physical keypad to dial phonewords can be difficult.

To circumvent this problem, it is possible to print out a drawing of a standard telephone keypad and to keep it with the mobile communication device. This allows a user to refer to the drawing in question when dialing using phonewords. However, keeping the telephone keypad drawing with the mobile communication device requires effort on the part of the user.

Therefore, improvements in phoneword dialing in mobile communication devices having a full physical keypad are desirable.

BRIEF DESCRIPTION OF THE DRAWINGS

Embodiments of the present disclosure will now be described, by way of example only, with reference to the attached Figures.

FIG. 5A shows a flowchart of a method in accordance with certain examples of the present disclosure.

FIG. 5B shows a flowchart of another method in accordance with certain examples of the present disclosure.

DETAILED DESCRIPTION

Figure 1:
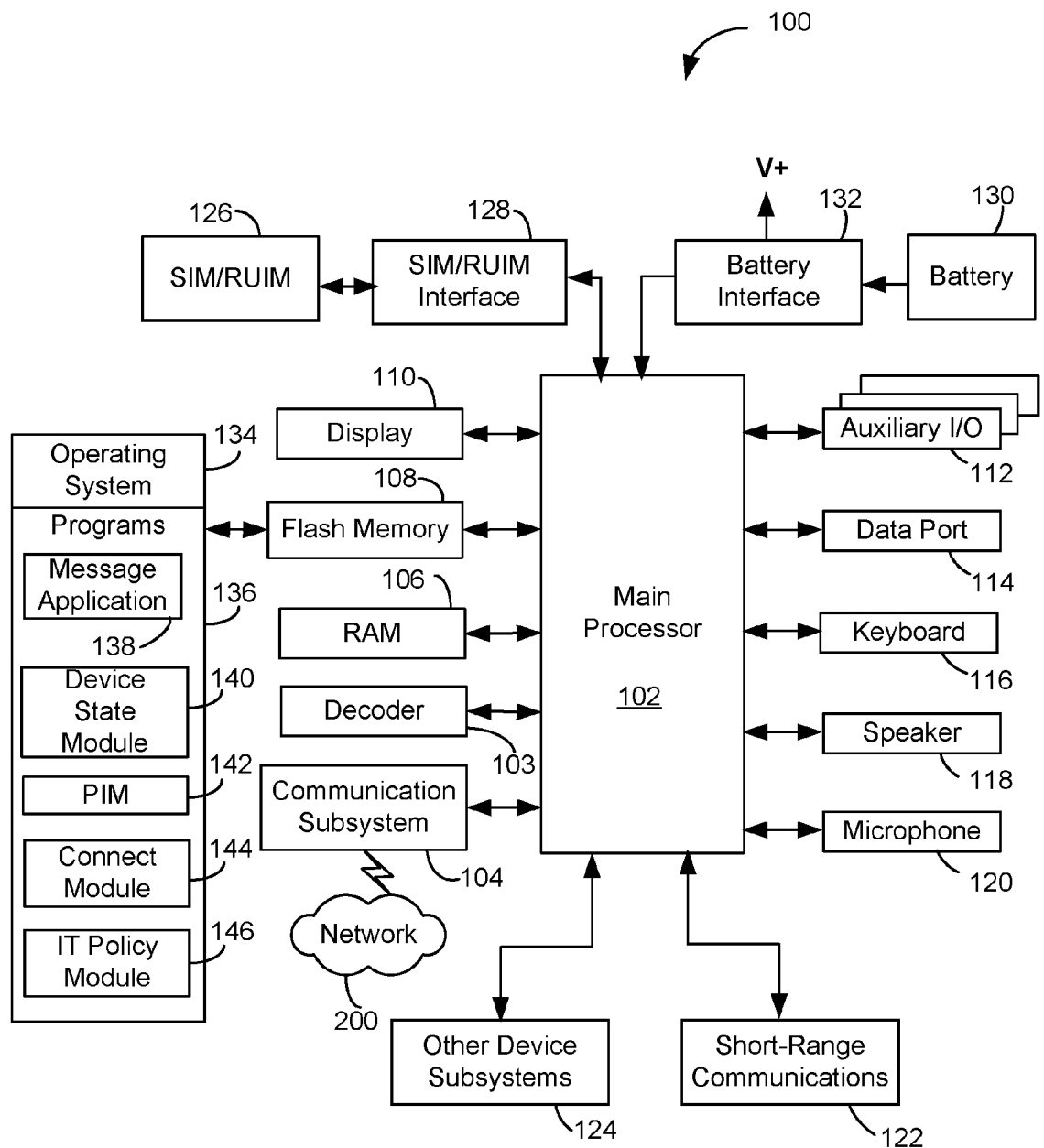
FIG. 1 shows an example of mobile communication device.

Generally, the present disclosure provides a method for dialing phonewords on mobile communication devices that have a full keyboard. The method can detect that a telephone number being entered may have associated thereto a phoneword, and provides a indication to the user that a pre-determined operation is required in order to dial by phoneword. For example, the indication can be a text indication displayed on the mobile communication device and the operation can be pressing a pre-determined key of the mobile communication device. Additionally, the method can allow the mobile communication device to display candidate phonewords or telephone numbers based on the partial telephone number or phoneword being entered.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

In a first aspect, the present disclosure provides a method of dialing a phoneword using a mobile communication device. The mobile communication device has a full keyboard that comprises a plurality of keys. The phoneword has a numerical beginning sequence and a remainder sequence. The remainder sequence has associated numbers thereto, at least one of the numbers has an associated letter. The method comprises: receiving the numerical beginning sequence as an input from the full keyboard; and in response to the received numerical beginning sequence, generating an indication to perform an operation on the mobile communication device to enable entry of a letter associated to the phoneword.

In a second aspect, the present disclosure provides a mobile communications device that comprises: a full keyboard comprising a plurality of keys and at least one processor coupled to the keyboard, the processor configured to receive inputs from the keyboard representing a phoneword having a numerical beginning sequence and a remainder sequence, the remainder sequence having associated numbers thereto, at least one of the numbers having an associated letter: the processor further configured to receive the numerical beginning sequence as an input from the full keyboard; and in response to the received numerical beginning sequence, generate an indication to perform an operation on the mobile communication device to enable entry of a letter associated to the phoneword.

The embodiments described herein generally relate to a mobile wireless communication device, hereafter referred to as a mobile communication device or as a mobile device. Examples of applicable communication devices include cellular phones, cellular smart-phones, handheld wireless communication devices and the like.

The mobile device is a two-way communication device with data communication capabilities including the capability to communicate with other mobile devices or computer systems through a network of transceiver stations. The mobile device also has the capability to allow voice communication. Depending on the functionality provided by the mobile device, it may be referred to as a data messaging device, a two-way pager, a cellular telephone with data messaging capabilities, a wireless Internet appliance, or a data communication device.

Referring first to FIG. 1, shown therein is a block diagram of an embodiment of a mobile device 100. The mobile device 100 includes a number of components such as a main processor 102 that controls the overall operation of the mobile device 100. Communication functions, including data and voice communications, are performed through a communication subsystem 104. Data received by the mobile device 100 can be decompressed and decrypted by decoder 103, operating according to any suitable decompression techniques (e.g.

YK decompression, and other known techniques) and encryption techniques (e.g. using an encryption techniques such as Data Encryption Standard (DES), Triple DES, or Advanced Encryption Standard (AES)). The communication subsystem 104 receives messages from and sends messages to a wireless network 200. In this embodiment of the mobile device 100, the communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 200 associated with mobile device 100 is a GSM/GPRS wireless network in one implementation, other wireless networks may also be associated with the mobile device 100 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems. The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, short-range communications 122 and other device subsystems 124. As will be described further below, the keyboard 116, which can be referred to as a keypad, can be a physical keyboard or a keyboard displayed on the display 110 when the display in question is a touch-sensitive display. A physical keyboard is a keyboard that comprises buttons that can move upon being depressed. Further, the keyboard 116 can be a full physical keyboard (full physical keypad), which, in the context of the present disclosure, is to be understood as being a keyboard with one key per letter of the Latin alphabet, or one key per letter of any other suitable alphabet.

Some of the subsystems of the mobile device 100 perform communication-related functions, whereas other subsystems may provide "resident" or on-device functions. By way of example, the display 110 and the keyboard 116 may be used for both communication-related functions, such as entering (typing) a text message for transmission over the network 200, and device-resident functions such as a calculator or task list.

The mobile device 100 can send and receive communication signals over the wireless network 200 after required network registration or activation procedures have been completed. Network access is associated with a subscriber or user of the mobile device 100. To identify a subscriber, the mobile device 100 requires a SIM/RUIM card 126 (i.e. Subscriber Identity Module or a Removable User Identity Module) to be inserted into a SIM/RUIM interface 128 in order to communicate with a network. The SIM card or RUIM 126 is one type of a conventional "smart card" that can be used to identify a subscriber of the mobile device 100 and to personalize the mobile device 100, among other things. Without the SIM card 126, the mobile device 100 is not fully operational for communication with the wireless network 200. By inserting the SIM card/RUIM 126 into the SIM/RUIM interface 128, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM card/RUIM 126 includes a processor and memory for storing information. Once the SIM card/RUIM 126 is inserted into the SIM/RUIM interface 128, it is coupled to the main processor 102. In order to identify the subscriber, the SIM card/RUIM 126 can include some user parameters such as an International Mobile Subscriber Identity (IMSI). An advantage of using the SIM card/RUIM 126 is that a subscriber is not necessarily bound by any single physical mobile device. The SIM card/RUIM 126 may store additional subscriber information for a mobile device as well, including datebook (or calendar) data and recent call data, which can also be referred to as data items. Alternatively, user identification data and data items can also be programmed into the flash memory 108.

The mobile device 100 is a battery-powered device and includes a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the mobile device 100. Although current technology makes use of a battery, future technologies such as micro fuel cells or capacitor-based power supplies may provide the power to the mobile device 100.

The mobile device 100 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, will normally be installed on the mobile device 100 during its manufacture. Other software applications include a message application 138 that can be any suitable software program that allows a user of the mobile device 100 to send and receive electronic messages. Various alternatives exist for the message application 138 as is well known to those skilled in the art. Messages that have been sent or received by the user are typically stored in the flash memory 108 of the mobile device 100 or some other suitable storage element in the mobile device 100. In at least some embodiments, some of the sent and received messages may be stored remotely from the device 100 such as in a data store of an associated host system that the mobile device 100 communicates with.

The software applications can further include a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the mobile device 100 is turned off or loses power.

The PIM 142 includes functionality for organizing and managing data items of interest to the user, such as, but not limited to, e-mail, contacts, which can also be referred to as an address book), calendar events, appointments, and task items. The PIM can also organize and manage any voice mails recorded on the mobile device 100. A PIM application has the ability to send and receive data items via the wireless network 200. PIM data items may be seamlessly integrated, synchronized, and updated via the wireless network 200 with the mobile device subscriber's corresponding data items stored in, or accessible by, a host computer system. This functionality creates a mirrored host computer on the mobile device 100 with respect to such items. This can be particularly advantageous when the host computer system is the mobile device subscriber's office computer system.

The mobile device 100 also includes a connect module 144, and an information technology (IT) policy module 146. The connect module 144 implements the communication protocols that are required for the mobile device 100 to communicate with the wireless infrastructure and any host system, such as an enterprise system, that the mobile device 100 is authorized to interface with.

The connect module 144 includes a set of application programming interfaces (APIs) that can be integrated with the mobile device 100 to allow the mobile device 100 to use any number of services associated with the enterprise system. The connect module 144 allows the mobile device 100 to establish an end-to-end secure, authenticated communication pipe with the host system. A subset of applications for which access is provided by the connect module 144 can be used to pass information technology (IT) policy commands from the host system to the mobile device 100. This can be done in a wireless or wired manner. These instructions can then be passed to the IT policy module 146 to modify the configuration of the device 100. Alternatively, in some cases, the IT policy update can also be done over a wired connection.

Other types of software applications can also be installed on the mobile device 100. These software applications can be third party applications, which are added after the manufacture of the mobile device 100. Examples of third party applications include games, calculators, utilities, etc.

The additional applications can be loaded onto the mobile device 100 through at least one of the wireless network 200, the auxiliary input/output (I/O) subsystem 112, the data port 114, the short-range communications subsystem 122, or any other suitable device subsystem 124. This flexibility in application installation increases the functionality of the mobile device 100 and may provide enhanced on-device functions, communication-related functions, or both. For example, secure communication applications may enable electronic commerce functions and other such financial transactions to be performed using the mobile device 100.

The data port 114 enables a subscriber to set preferences through an external device or software application and extends the capabilities of the mobile device 100 by providing for information or software downloads to the mobile device 100 other than through a wireless communication network. The alternate download path may, for example, be used to load an encryption key onto the mobile device 100 through a direct and thus reliable and trusted connection to provide secure device communication.

The data port 114 can be any suitable port that enables data communication between the mobile device 100 and another computing device. The data port 114 can be a serial or a parallel port. In some instances, the data port 114 can be a USB port that includes data lines for data transfer and a supply line that can provide a charging current to charge the battery 130 of the mobile device 100.

The short-range communications subsystem 122 provides for communication between the mobile device 100 and different systems or devices, without the use of the wireless network 200. For example, the subsystem 122 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download will be processed by the communication subsystem 104 and input to the main processor 102. The main processor 102 will then process the received signal for output to the display 110 or alternatively to the auxiliary I/O subsystem 112. A subscriber may also compose data items, such as e-mail messages, for example, using the keyboard 116 in conjunction with the display 110 and possibly the auxiliary I/O subsystem 112. The auxiliary subsystem 112 may include devices such as: a touch screen, mouse, track ball, infrared fingerprint detector, or a roller wheel with dynamic button pressing capability. The keyboard 116 is preferably an alphanumeric keyboard, a telephone-type keypad, or both. However, other types of keyboards may also be used. A composed item may be transmitted (sent) over the wireless network 200 through the communication subsystem 104.

For voice communications, the overall operation of the mobile device 100 is substantially similar, except that the received signals are output to the speaker 118, and signals for transmission are generated by the microphone 120. Alternative voice or audio I/O subsystems, such as a voice message recording subsystem, can also be implemented on the mobile device 100. Although voice or audio signal output is accomplished primarily through the speaker 118, the display 110 can also be used to provide additional information such as the identity of a calling party, duration of a voice call, or other voice call related information.

Phoneword dialing is a well-known method of dialing a telephone number to which is associated a word, an acronym, or an alphabetical sequence that is easy to remember. Phoneword dialing is mostly, but not exclusively, associated with toll-free numbers and prime rate numbers. The association of letters to a phoneword is generally set in accordance with the mapping shown at Table I.

TABLE I

| Letter | Number |
|---|---|
| a, b, or c | 2 |
| d, e, or f | 3 |
| g, h, or i | 4 |
| j, k, or l | 5 |

TABLE I-continued

| Letter | Number |
| --- | --- |
| m, n, or o | 6 |
| p, q, r, or s | 7 |
| t, u, or v | 8 |
| w, x, y, or z | 9 |

Figure 2:
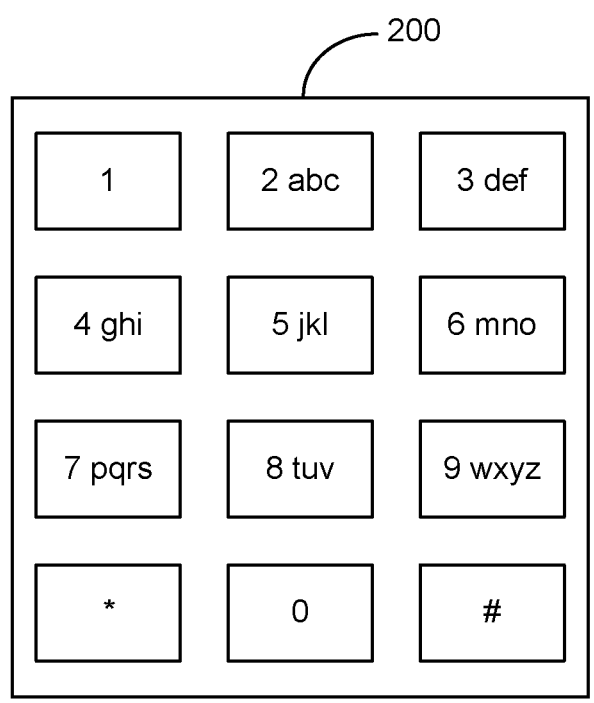
FIG. 2 shows a standard telephone keypad.

As examples of phonewords, the phoneword 1-800-GOFEDEX corresponds to the telephone number 1-800-463-3339 and the phoneword 1-800-FLOWERS corresponds to the telephone number 1-800-356-9377. The letter-to-number mapping of Table I has a counterpart standard telephone keypad 200 shown at FIG. 2, which is used on landline telephone as well as on some mobile devices.

Progress in mobile communication devices has led to mobile communication devices that have full physical keyboards. This allows users to write (type) messages efficiently. However, dialing by phoneword using a full physical keyboard can be challenging as discussed below.

Figure 3:
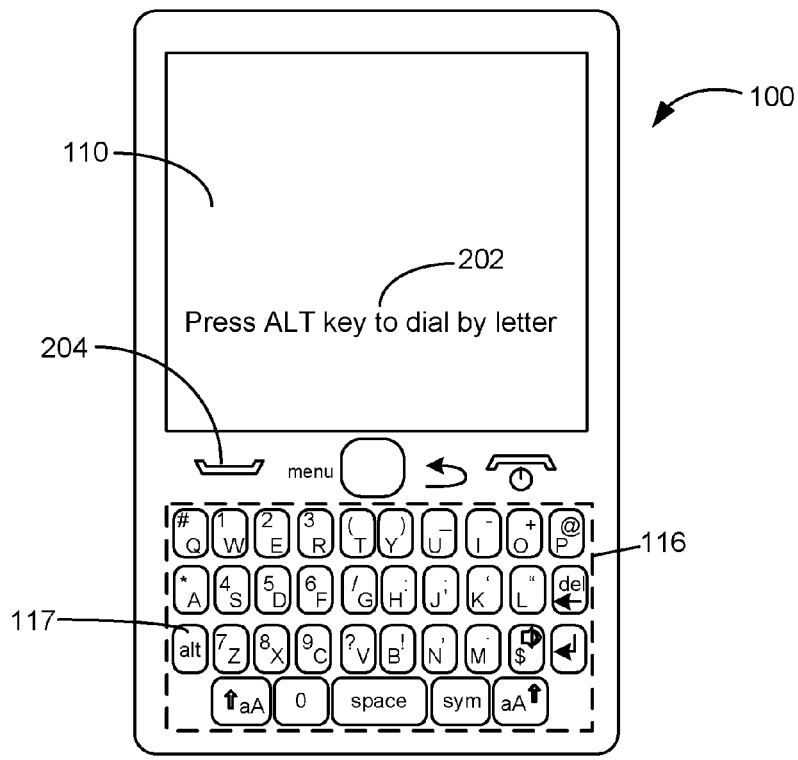
FIG. 3 shows an example of a mobile communication device equipped with a full keyboard.

FIG. 3 shows a mobile communication device in accordance to certain examples of the present disclosure. The mobile communication device 100 has a full physical keyboard 116 and a display 110. The full physical keyboard 116 has keys with the letters W, E, R, S, D, F, Z, X, and C associated with numbers 1, 2, 3, 4, 5, 6, 7, 8, and 9 respectively. However, any type of keyboard having a different association of letters to numbers is also within the scope of the present disclosure. As an example of a keyboard that is also within the scope of the present disclosure is a keyboard that has keys with the letters Q, W, E, R, T, Y, U, I, O, and P associated to the numbers 1, 2, 3, 4, 5, 6, 7, 8, 9, and 0 respectively. In the present context, a key with a particular letter being associated with a particular number includes keys where both the particular letter and particular number appear (are inscribed) on the key.

In some mobile communication devices with full physical keyboards, pressing a pre-determined key, for example, the "ALT" key 117, will enable dialing an alphabetic sequence of a phoneword. As an example, using the full physical keyboard 116 to dial 1-800-GOFEDEX would require the user to dial (enter) 1-800 followed by holding down the "ALT" key 117 while pressing the keys G, O, F, E, D, E, and X (or by pressing and releasing the "ALT" key 117 before entering each letter G, O, F, E, D, E, and X). As simple as this may sound, a large proportion of users will not be aware of this feature and, consequently, will not be able to efficiently dial (enter) phonewords using the full physical keyboard 116.

The present disclosure can address this situation by indicating to the user that dialing by phoneword (entering letters of a phoneword) can be done by holding down the "ALT" key 117 or any other suitable pre-determined key. The indication provided to the user can be a visual indication displayed on the display 110. For example, an indication 202 spelling out "Press ALT to dial by letter", which is a visual or text indication, can be displayed on the display 110. Any other suitable type of indication can be used without departing from the scope of the present disclosure. For example, instead of, or in addition to, the text indication 202 "Press ALT to dial by letter", there can be a pictograph (also referred to as a pictogram or an ideogram) indication displayed on the display. As another example of a type of indication that can be used to indicate that a pre-determined key can be used to dial by letter, the mobile device 100 could play an audio indication to press the pre-determined key to dial by letter. The audio indication can be a spoken message, a ringtone, or any other suitable type audio indication. As yet another example of a type of indication that can be used to indicate that a pre-determined key can be used to dial by letter, the mobile device 100 could, if it includes a vibration device (e.g, a vibe motor or piezo-electric elements), vibrate to draw the user's attention to a text or pictograph indication displayed on the display 110.

In some embodiments, instead of having to hold down a pre-determined key (e.g., the "ALT" key) to enable dialing letters, the user might have to press and hold, for a pre-determined time period, the keys of the letters of the phoneword. For example, if the user whishes to enter the letter R using the keyboard 116 of FIG. 3, the user would press and hold the key on which are inscribed the letter R and the number 3. At first the number 3 would be entered but, after the key is pressed and held pressed for the pre-determined period of time, the letter R would be entered and would replace the number 3.

Other than 1-800 numbers, examples of toll-free numerical beginning sequences that may have associated thereto a phoneword and that can cause the mobile communication device 100 to provide an indication to press a pre-determined key (or to perform any other suitable action) to dial by letter can include, for example, in North America, 1-855, 1-866, 1-877, and 1-888 (for the purpose of the present disclosure, a numerical beginning sequence can be referred to as a prefix or as a telephone number prefix). Additionally, the indication to press a pre-determined key to dial by letter can be provided when the telephone establishes that the numerical beginning sequence is that of a prime-rate telephone number, which may have associated thereto a phoneword. For example, in North America, the initial dialing sequence 1-900 is that of prime-rate telephone numbers, which can be associated with chat lines, voting for television shows, contests, and other types of services. Other countries may have different toll-free telephone number numerical beginning sequences as well as different prime-rate telephone number numerical beginning sequence. For example, in Germany, the equivalent of 1-800 numbers is 0800 numbers. Any type of telephone number that has a numerical beginning sequence that may have associated thereto a phoneword is to be considered as being within the scope of the present disclosure.

The indication (e.g., the text indication 202) can be provided when the mobile communication device determines that the initial dialing sequence, for example 1-800, is that of a telephone number that may have associated thereto a phoneword. Alternatively, the indication 202 can be provided when the mobile communication device 100 is set into its telephone mode by pressing the "place call" key 204. This can be useful when local telephone numbers have associated thereto a phoneword.

Figure 4:
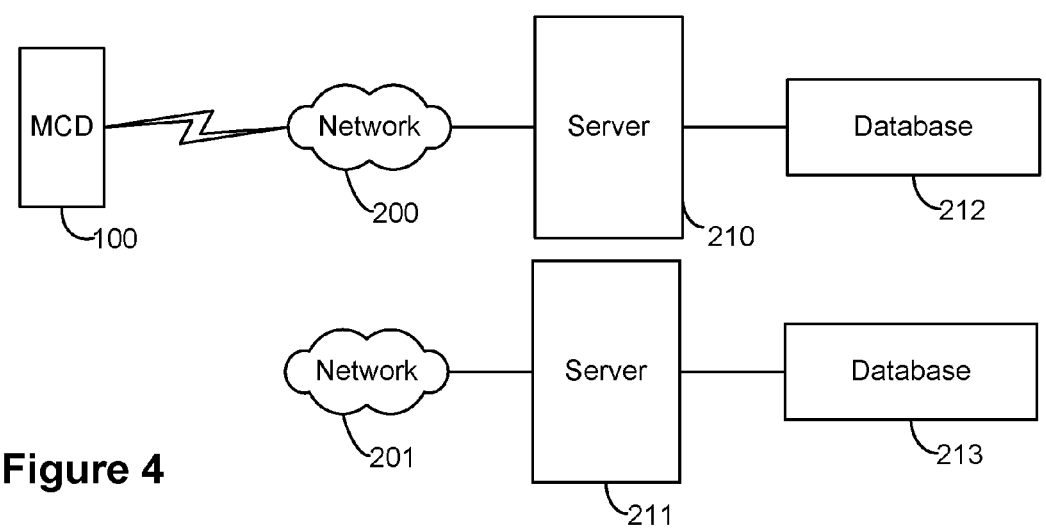
FIG. 4 shows a mobile communication device operationally connected to a server and a database through a network.

FIG. 4 shows an example of the mobile communication device 100 being operationally connected to the network 200 in accordance with certain examples of the present disclosure. The network 200 is operationally connected to a server 210, which can include, or which can be connected to, a database 212. The database 212 can include telephone numbers or a listing of telephone numbers that may have associated thereto a phoneword. The listing can include toll-free telephone numbers, prime-rate telephone numbers, and any other type of telephone number that has an initial dialing sequence indicative of the possibility of the telephone number having a phoneword associated thereto. The database can also include a table of prefixes to which phonewords may be associated. Such prefixes may include toll free number prefixes (e.g., 1-800, 1-888, etc.) and prime rate telephone number prefixes (e.g., 1-900).

Also shown in FIG. 4 is a different network 201 to which the mobile communication device 100 can become operationally connected when the mobile communication device 100 enters the coverage area of the network 201. The network 201 is operationally connected to a server 211, which can include, or which can be connected to, a database 213. The database 213 can include telephone numbers or a listing of telephone numbers that may have associated thereto a phoneword. The listing can include toll-free telephone numbers, prime-rate telephone numbers, and any other type of telephone number that has an initial dialing sequence indicative of the possibility of the telephone number having a phoneword associated thereto. The database can also include a table of prefixes to which phonewords may be associated. Such prefixes may include toll free number prefixes and prime rate telephone number prefixes. The prefixes associated to the database 213 may be different than those associated with the database 212.

When the mobile communication 100 device is activated (switched on) and its network communications capabilities are enabled, the mobile communication device 100 connects to the network 200. During the establishment of a connection between the mobile communication device 100 and the network 200, the mobile communication device 100 can obtain parameters from the network 200. The parameters can include the aforementioned prefixes that may have associated thereto phonewords. The parameters and prefixes obtained by the mobile communication device 100 from the network 200 may depend on the location of the network 200. For example, if the network 200 is in North America, the parameters might include, as prefixes (numerical beginning sequences), 1-800, 1-855, 1-866, 1-877, 1-888, and 1-900. As another example, if the network 200 is in Germany, the uploaded parameters would include, as a numerical beginning sequence, 0800. The parameters can be stored, for example, in the RAM 106 (shown at FIG. 1) or in any other suitable memory of the mobile communication device 100.

Once the aforementioned parameters and valid numerical beginning sequences are present (stored) in the mobile communication device 100, a phoneword indication program running on the mobile communication device 100 can provide an indication when a numerical beginning sequence that may have associated thereto a phoneword is received (entered) at the mobile communication device 100. The phoneword indication program can be one of the software components 136 (FIG. 1) of the mobile communication device 100.

FIG. 5A is a flowchart of a method according to certain embodiments of the present disclosure and relates to how an indication can be provided when dialing telephone numbers that may have associated thereto a phoneword. At action 214, the mobile communication device is activated. Following activation, at action 216, the mobile communication device 100 connects to the network 200 and obtains numerical beginning sequences (prefixes) from the network 200. The valid numerical beginning sequences can be downloaded from the network 200 by the mobile communication device 100 or, can be uploaded by the network 200 to the mobile communication device 100. The valid numerical beginning sequences in question will depend on the location of the network 200. For the purpose of the present disclosure, the location of the network 200 includes the area covered (served) by the network 200. As an example, when the network 200 is located in North America, the parameters obtained by the mobile communication device may include toll free telephone number numerical beginning sequences (1-800, -855, 1-866, 1-877, and 1-888), and the prime rate numerical beginning sequence (1-900). Further, the valid numerical beginning sequences obtained by the mobile communication device 100 from the network 200 may pertain only to toll-free telephone numbers accessible from the province of state in which the network 200 is located.

At step 218, still at the mobile communication device 200, a numerical beginning sequence is received (entered) and, at step 220, the numerical beginning sequence received (entered) at 218 is compared to prefixes obtained at step 216. The comparison effected at the mobile communication device 100 will return a match status indicating whether or not there is a match between the numerical beginning sequence entered at step 218 and the prefixes obtained at step 216. At step 220, the mobile communication device 100 provides the indication to perform an action if the match status is positive. If the match is negative, the indication is not provided. As described above, the indication can include, among others, displaying a text message on the display 110 of the mobile communication device.

FIG. 5B is a flowchart of a method according to certain embodiments of the present disclosure and relates to how an indication can be provided when dialing, with a mobile communication device that has a full keyboard, telephone numbers that may have associated thereto a phoneword. The method of FIG. 5B relates to a scenario where a mobile communication device, for example, the mobile communication device 100 of FIG. 4, is going from being connected to an original network (e.g., network 200 in FIG. 4) to being connected to a different network (e.g., network 201 in FIG. 4) that may have different valid numerical beginning sequences.

At step 215, the mobile communication device 100 operating in (connected to) a network 200 (FIG. 4) enters a coverage area of a different network 201 (FIG. 4). Subsequent entering the coverage area of the different network 201, at step 217, the mobile communication device 100 connects to the different network 201 and obtains numerical beginning sequences (prefixes) from the different network 201. The valid numerical beginning sequences can be downloaded from the different network 201 by the mobile communication device 100 or, can be uploaded by the different network 201 to the mobile communication device 100. The valid numerical beginning sequences in question will depend on the location of the different network 201. For the purpose of the present disclosure, the location of the different network 201 includes the area covered (area served) by the different network 201. The valid numerical beginning sequences obtained by the mobile communication device 100 from the different network 201 may pertain only to toll-free telephone numbers accessible from the province, state, or jurisdiction in which the different network 201 is located.

At step 219, still at the mobile communication device 200, a numerical beginning sequence is received (entered) and, at step 221, the numerical beginning sequence received (entered) at 219 is compared to prefixes obtained at step 217. The comparison effected at the mobile communication device 100 will return a match status indicating whether or not there is a match between the numerical beginning sequence entered at step 219 and the prefixes obtained at step 217. At step 221, the mobile communication device 100 provides the indication to perform an operation if the match status is positive. If the match is negative, the indication is not provided. As described above, the indication can include, among others, displaying a text message on a display of the mobile communication device.

Figure 6:
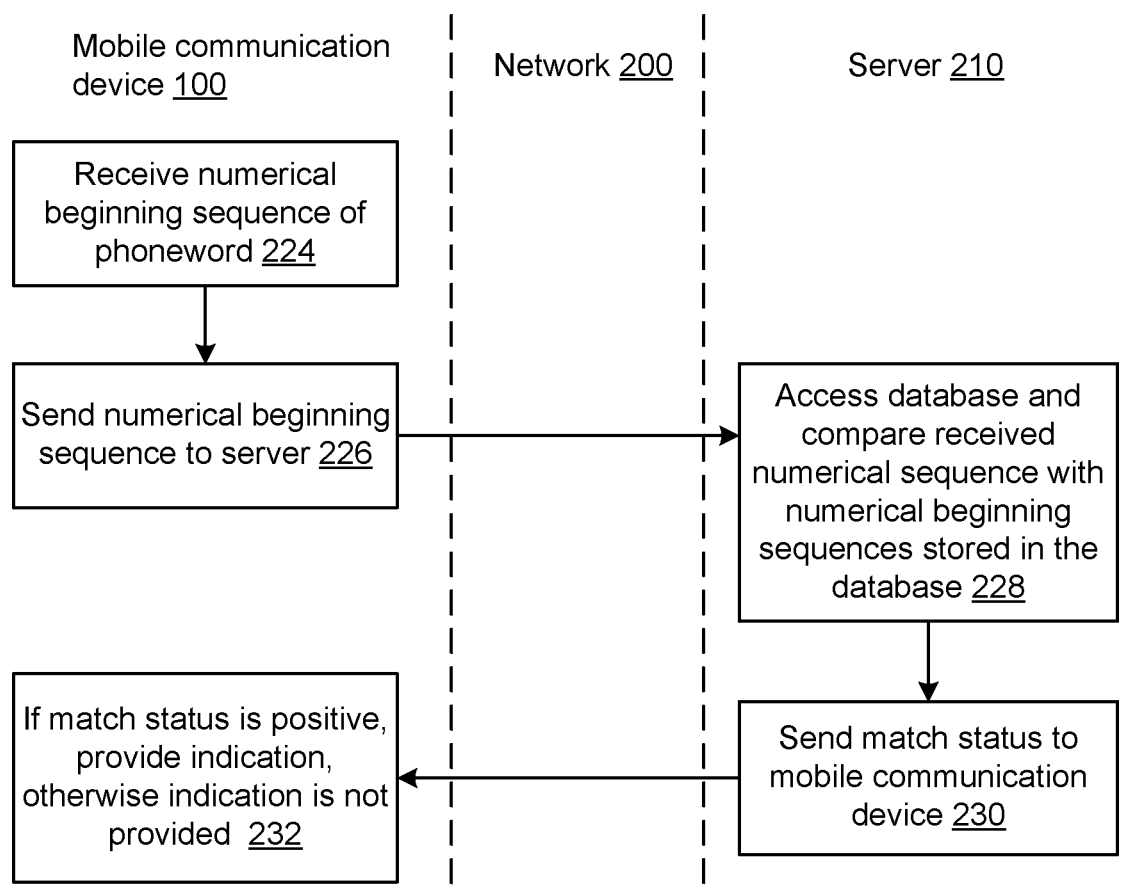
FIG. 6 shows flowchart of a further method in accordance with certain examples of the present disclosure.

FIG. 6 is a flowchart of a method in accordance to certain examples of the present disclosure. At the mobile communication device 100, the numerical beginning sequence of a phoneword, or of a telephone number that might be a phoneword, is received (entered) at action 224. Subsequently, at action 226, the numerical beginning sequence is sent to the server 210, through the network 200. At action 228, the server 210 accesses the database 212 and compares the numerical beginning sequence received from the mobile communication device 100 to numerical beginning sequences that may have associated thereto a phoneword. The comparison effected at the server 210 will return a match status indicating whether or not there is a match between the numerical beginning sequence sent from the mobile communication device 100 to the server 210 and the numerical beginning sequences listed in the database 212. At action 230, the match status is sent to the mobile communication device 100, through the network 200. At action 232, the mobile communication device 100 provides the indication to perform an action if the match status is positive, otherwise, the indication is not provided. As described above, the indication can include, among others, displaying a text message (text indication) on the display 110 of the mobile communication device.

Figure 7:
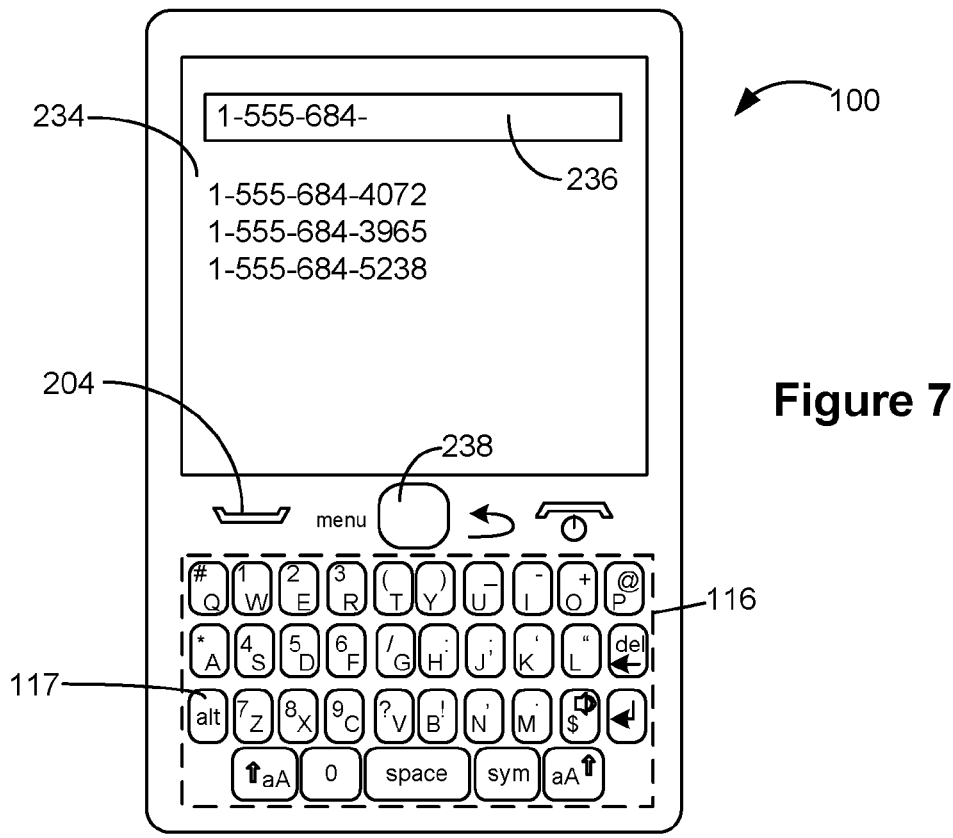
FIGS. 7-12 shows a mobile communication device with a Call Log interface showing various items.

In some mobile communication devices, pressing the "place call" key 204 will result in a Call Log interface being shown on the display of the device. The Call Log interface allows the user to enter, using the keyboard 116, a telephone number to be dialed. As the telephone number is being dialed, i.e., as digits are entered, previously logged called telephone numbers that match the sequence of digits entered thus far are displayed to the user who may stop entering digits of the telephone number and instead select one of the telephone numbers being displayed. FIG. 7 shows an example of a mobile communication device 100 with a Call Log interface 234, which has an input window 236 in which the digits 1-555-684 have been entered. As a result of those digits having been entered, the Call Log interface 234 displays three numbers that were previously dialed and that include the beginning sequence 1-555-684, namely, 1-555-684-4072, 1-555-684-3965, and 1-555-684-5238. Alternatively, or additionally, the Call Log interface can present to the user numbers that are listed in a telephone number store present in a memory of the mobile communication device 100. If the user wishes to dial a telephone number that does not correspond to one of the three displayed numbers, he simply continues to enter digits of the telephone number he wishes to reach. If the user wishes to dial one of the three numbers appearing on the Call Log interface 234, he can simply select the desired telephone number using any suitable display navigation means such as, for example, a navigation button 238.

Figure 8:
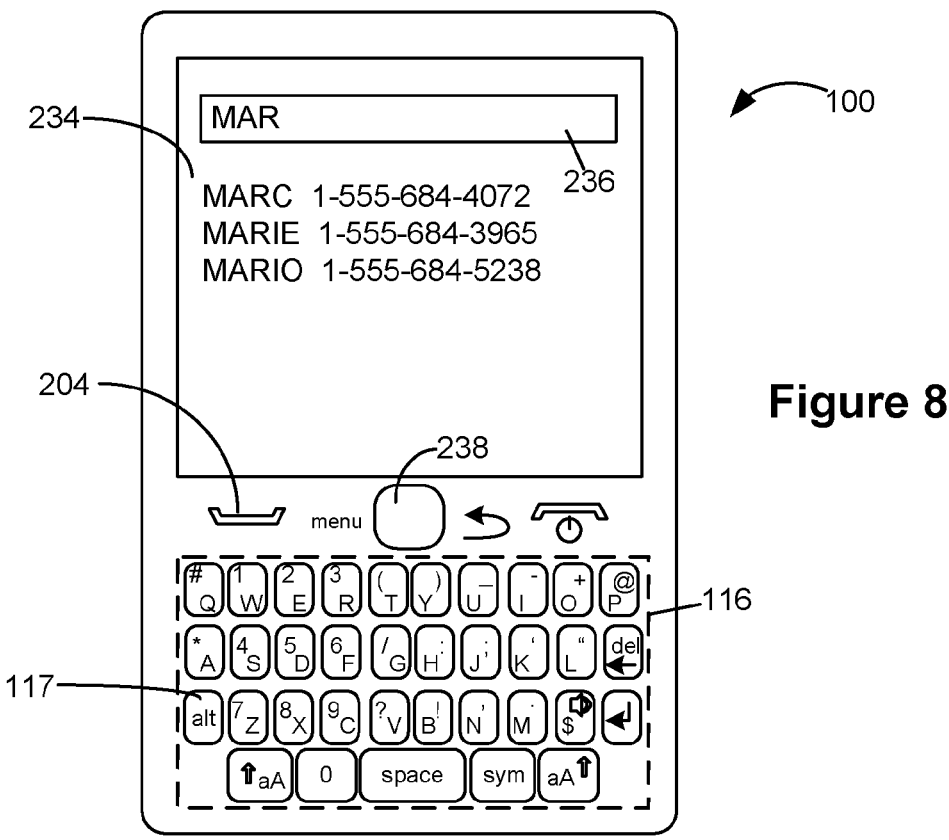

The Call Log interface 234 may also be used to search contact names stored in the mobile communication device 100. For example, when the user wishes to retrieve contact information (e.g., a telephone number) of a person named "Marie", he simply begins entering the letters M, A, R, I, and E using the keyboard 116. As the user enters the letters, the names that have a corresponding sequence of letters are displayed on the Call Log interface and can be selected by the user, at any time. FIG. 8 shows an example where the letters M, A, and R have been entered in the input window 36 and where the names, and their corresponding telephone numbers, Marc, Marie, and Mario are displayed in the Call Log interface 234. The user can select "Marie" using the navigation button 238.

Figure 9:
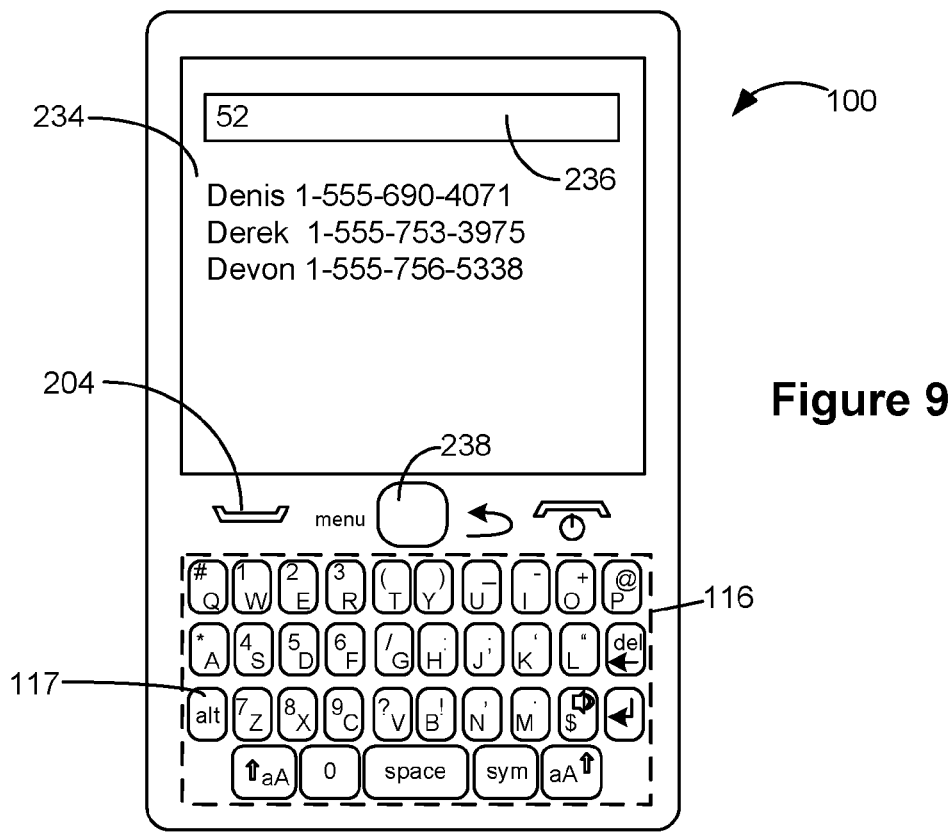
Figure 10:
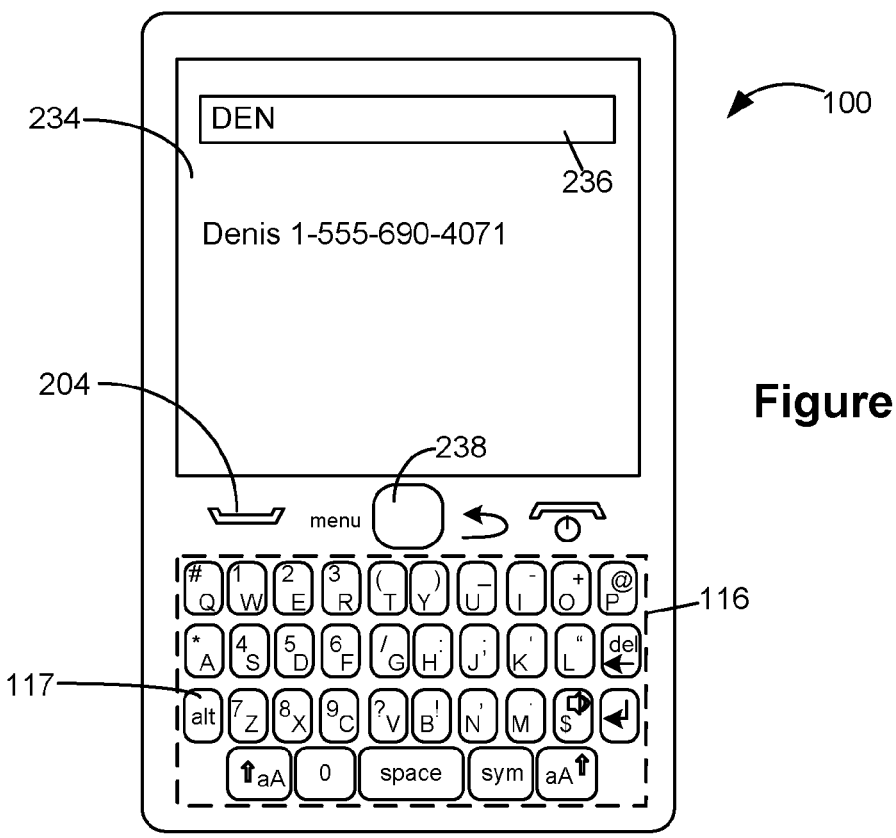

The Call Log interface 234 is often set by the mobile communication device manufacturer to display, in the input window 236, numbers as long as only numbers have been entered at the keyboard 116. For example, if the user wishes to search for the contact information of a person named "Denis", the user would enter the letters D, E, N, I, and S. The search window 236 would start displaying 5 (corresponds to D) and then 52 (correspond to DE); simultaneously, the Call Log interface 234 would display names that begin with D and E, as well as telephone numbers that begin with 52. FIG. 9 shows an example of a scenario where the digits 5 and 2 are displayed in the search window 236 and where the names Denis, Derek, and Devon are listed in the Call Log interface 234, which does not, in this example, list any telephone number beginning with 52. Subsequently, after the user has entered the letter N, which does not have any number associated thereto, the search window 236 would display DEN and only Denis would be displayed in the Call Log interface 234. This is shown in FIG. 10.

Figure 11:
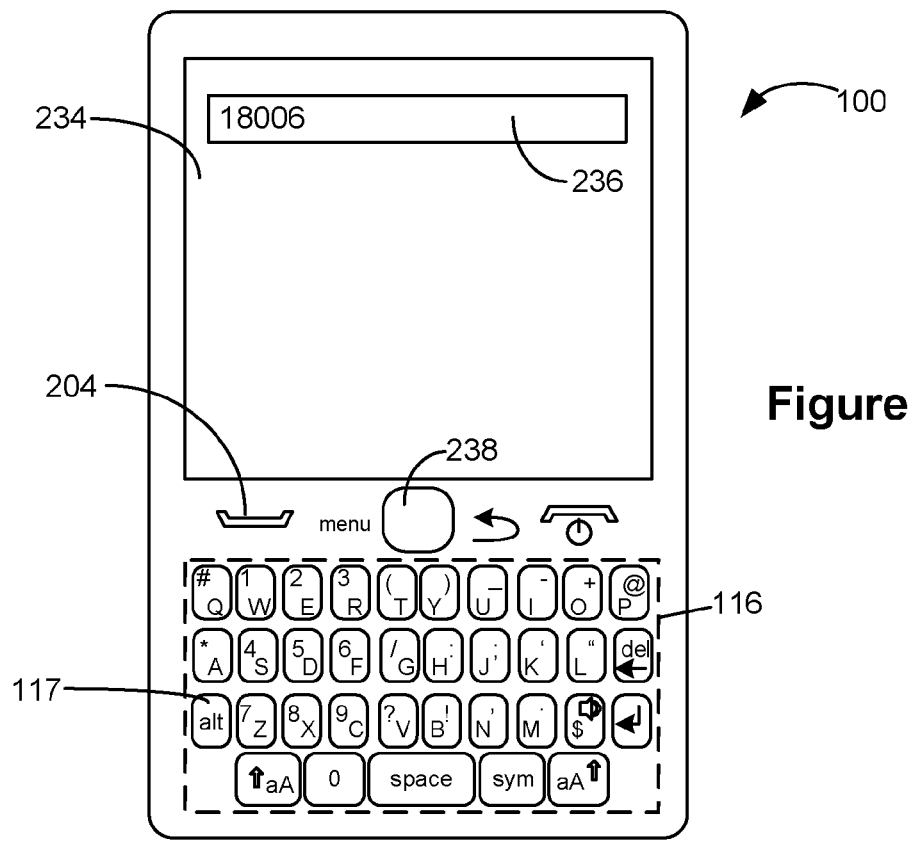
Figure 12:
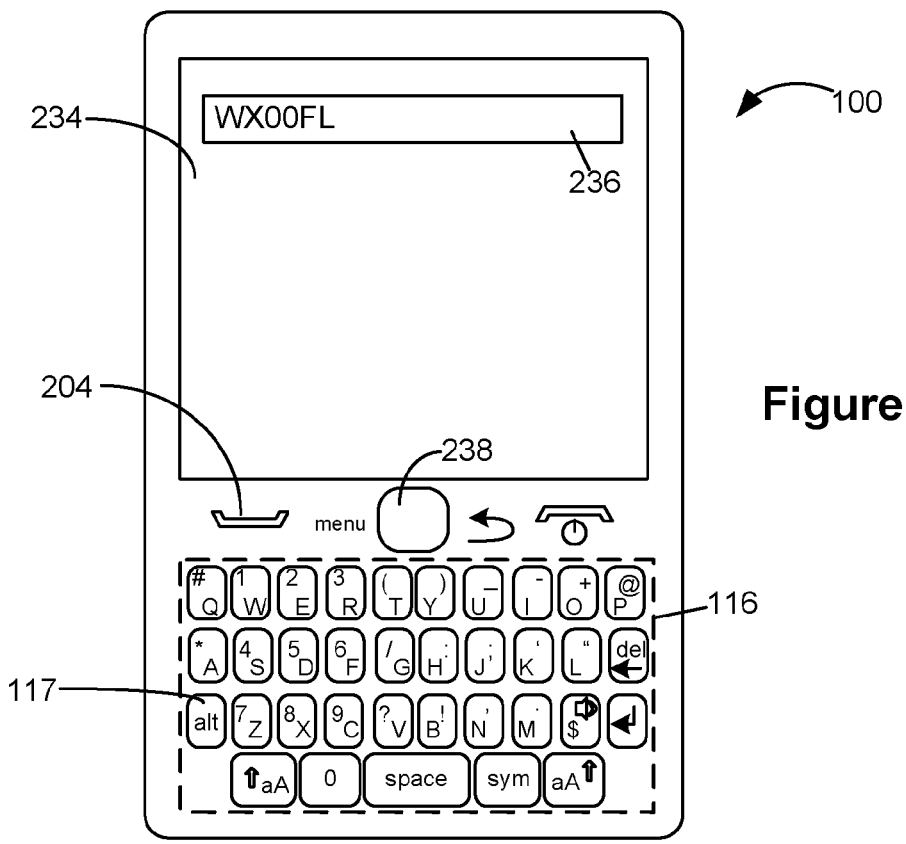

As such, a user dialing a phoneword that includes letters that do not have associated thereto a letter will likely notice when he missed holding down the "ALT" key (or to perform any other pre-determined suitable action) to dial a letter. For example, if the user begins dialing the phoneword 1-800-FLOWERS but forgets to hold the "ALT" key when using the keyboard 116, the Call Log interface 234 will first display, in the search window 236, the number 18006, which is shown in FIG. 11. However, as the user dials the letter L, the search window 234 will display WX00FL, shown in FIG. 12, which is nonsensical in that it is neither a telephone number nor an entry in the contacts list of the mobile communication device. Clearly, the user should then notice that a dialing error was made and that correction is required. Similarly, if the user begins dialing the phoneword 1-800-GOFEDEX but forgets to hold the "ALT" key when using the keyboard 116, the Call Log interface 234 will first display, in the search window 236, the number 1800. However, as the user dials the letter G, the search window 234 will display WX00G, which, again, is nonsensical in that it is neither a telephone number nor an entry in the contacts list of the mobile communication device.

Figure 13:
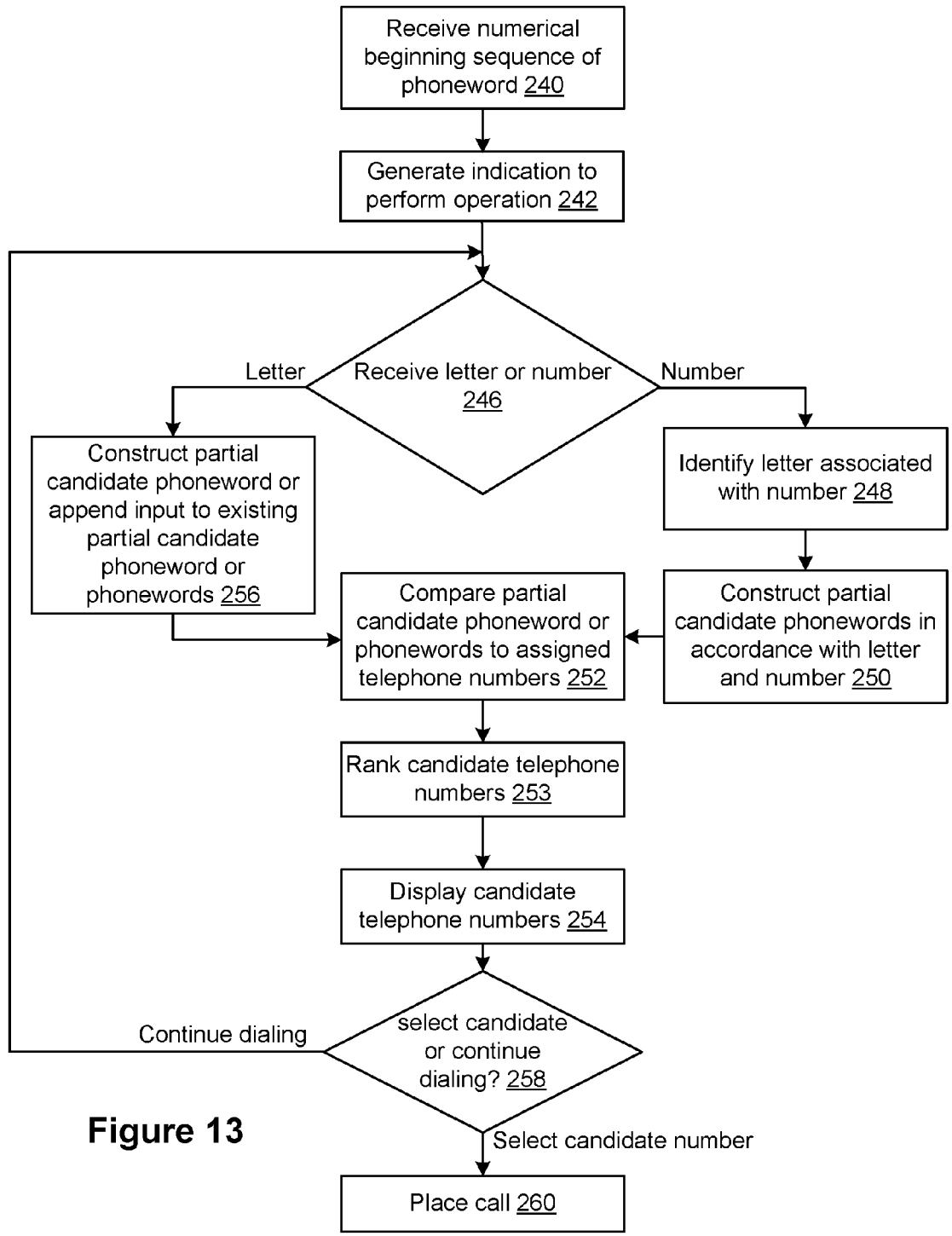
FIG. 13 shows a flowchart of yet another method in accordance with certain examples of the present disclosure.

Another type of error when dialing phonewords is when the user holds down the "ALT" key when dialing some letters but not when dialing other letters that happen to have numbers associated thereto. The letters in question are, in the example of the keyboard 116, W, E, R, S, D, F, Z, X and C. As an example, if the phoneword to be entered is 1-800-GOFEDEX, which corresponds to the telephone number 1-800-463-3339, but the user omits to hold down the pre-determined key (e.g., the "ALT" key) after having properly dialed 1-800-GO, the resulting phoneword entered would be 1-800-GO62528, corresponding to the telephone number 1-800-4662528, which, as far as the inventors are aware of, is not an assigned or registered 1-800 number. FIG. 13 is a flowchart of a method of the present disclosure in accordance to certain embodiments of the present disclosure, which can help reduce the occurrence of such errors.

FIG. 13 is described as follows. At action 240, the numerical beginning sequence (or prefix) of a phoneword is entered at a mobile communication device. In response to having received the numerical beginning sequence, the mobile communication device generates (provides), at action 242, an indication advising that a particular operation needs to be performed in order to enter an alphabetical sequence or a letter of the phoneword. For example, the indication can be a text indication shown on a display of the mobile communication device, and the operation can be an actuation of a pre-determined key on the keyboard of the mobile communication device.

At action 246, the mobile communication device receives a letter or a number entered at the mobile communication device. A letter is received if the above-noted operation was performed and if a key having the letter associated thereto was pressed in concordance with the operation. A number is received if the above-noted operation was not performed and a number key was pressed. If a number was entered, the method proceeds to action 248 where the letter associated with the input provided at 244 is identified. For example, it the number 5 was and if that key also has associated thereto the letter D, then the letter identified at 248 will be the letter D.

At action 250, partial candidate phonewords (which include candidate telephone numbers) are constructed in accordance with the numerical beginning sequence received at 240, in accordance with the number entered at 246, and in accordance with the letter identified at action 248. For example, if the numerical beginning sequence is 1-800, the number entered at 246 is 5, and the letter identified at 248 is D, then the partial candidate phonewords are 1-800-D (which corresponds to 1-800-3 when the letter D corresponds to 3 on a standard keypad) and 1-800-5.

At action 252, the partial candidate phonewords are compared to assigned phonewords to identify assigned phonewords (which include assigned telephone numbers) that include the partial candidate phonewords. Referring back to FIG. 4, the comparison can be effected at the server 210, which can be referred to as a comparison module. The assigned phonewords that include the partial candidate phonewords are displayed on the mobile communication device at action 254 where they can be selected by the user. Optionally, at action 253, the assigned phonewords that include the partial phonewords can be ranked in accordance with any suitable ranking method or predictive algorithm to obtain ranked assigned phonewords. The ranked assigned phonewords can be displayed in rank order at action 254. As an example, the ranking may be performed in accordance with how often the phonewords in question are called by the user of the mobile communication device or by all the users that have dialed the phonewords in question. Referring back to FIG. 4, the ranking of the phonewords may be performed at the server 210.

Referring again to action 246 of FIG. 13, if a letter is received, the method proceeds to action 256 where a partial candidate phoneword is constructed. As an example, if the input was the letter D, then the constructed phoneword will be 1-800-D. The method then proceeds to actions 252 and 254 as described above.

Following action 254, the method proceeds to action 258 where continued dialing of the phoneword or selection of a displayed telephone number (phoneword) can be effected. If dialing is to be continued, the method loops back to action 246 to receive another letter or number. For example, if the letter E is received, and, for example, if the existing partial phonewords are 1-800-D and 1-800-5 as described above, then the constructed phonewords resulting from 256 will be 1-800-DE (1-800-33 on a standard keypad) and 1-800-5E (1-800-53). However, if the number 2 on full keyboard of mobile communication device was entered, then the method proceeds to action 248 where the letter associated with the number 2 is identified (the letter in question is E in the present example). Subsequently, at action 250, the partial candidate phonewords 1-800-D2 (1-800-32), 1-800-52, 1-800-DE (1-800-33), and 1-800-53 are constructed. The method may then proceeds to actions 252, 253, 254, and 258 as described above.

It is to be noted that the candidate telephone numbers displayed at action 254 can be displayed as phonewords, numbers, or as both without departing from the scope of the present disclosure. For example, the phoneword 1-800-GOFEDEX could be displayed as such or as 1-800-463-3339, or as both 1-800-GOFEDEX and 1-800-463-3339.

Upon the selection of a candidate number at action 258, the method proceeds to action 260 where the call can be placed.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method of dialing a phoneword using a mobile communication device, the mobile communication device having a full keyboard comprising a plurality of keys, the phoneword having a numerical beginning sequence and a remainder sequence, the remainder sequence having associated numbers thereto, at least one of the numbers having an associated letter, the method comprising:
   receiving the numerical beginning sequence as an input from the full keyboard;
   comparing the numerical beginning sequence to valid numerical beginning sequences, a valid numerical beginning sequence being a numerical beginning sequence that may be associated with a phoneword; and
   in response to determining that the received numerical beginning sequence is a valid numerical beginning sequence, generating an indication to perform an operation on the mobile communication device to enable entry of any letter of the remainder sequence.

2. The method of claim 1 wherein:
   the portable electronic device includes a display; and
   generating the indication to perform the operation includes displaying a message on the display, the message to indicate the operation to perform.

3. The method of claim 2 wherein the operation includes pressing a key of the keyboard.

4. The method of claim 1 further comprising receiving a number at the full keyboard.

5. The method of claim 4 further comprising identifying a letter associated with the number.

6. The method of claim 5 further comprising
constructing partial candidate phonewords in accordance with:
the numerical beginning sequence;
the number; and
the letter associated to the number.

7. The method of claim 6 further comprising:
providing the partial candidate phonewords to a comparison module; and
receiving, from the comparison module, candidate phonewords that match the partial candidate phonewords.

8. The method of claim 7 further comprising displaying for selection, on the mobile communication device, the candidate phonewords.

9. The method of claim 6 further comprising:
comparing the partial candidate phonewords with known phonewords to obtain candidate phonewords; and
displaying for selection, on the mobile communication device, the candidate phonewords.

10. The method of claim 9 wherein comparing the partial candidate phonewords with known phonewords is preceded by accessing a database of phonewords.

11. The method of claim 9 wherein:
displaying for selection is preceded by ranking the candidate phonewords to obtain ranked candidate phonewords; and
displaying for selection includes displaying, as a function of rank, the ranked candidate phonewords.

12. The method of claim 11 wherein ranking the candidate phonewords includes ranking the candidate phonewords as a function of a number of calls placed to each candidate phoneword.

13. The method of claim 1 wherein providing the indication to perform the operation is preceded by detecting that the numerical beginning sequence is that of a phoneword.

14. The method of claim 1 wherein receiving the numerical beginning sequence is preceded by the identifying of the valid numerical beginning sequences.

15. The method of claim 14 wherein identifying the valid numerical beginning sequences includes downloading the valid numerical beginning sequences from a network to which the mobile communication device is operationally connected.

16. A mobile communications device, comprising:
a full keyboard comprising a plurality of keys and at least one processor coupled to the keyboard, the processor configured to receive inputs from the keyboard representing a phoneword having a numerical beginning sequence and a remainder sequence, the remainder sequence having associated numbers thereto, at least one of the numbers having an associated letter:
the processor further configured to receive the numerical beginning sequence as an input from the full keyboard, to compare the numerical beginning sequence to valid numerical beginning sequences, a valid numerical beginning sequence being a numerical beginning sequence that may be associated with a phoneword; and
in response to determining that the received numerical beginning sequence is a valid numerical beginning sequence, generating an indication to perform an operation on the mobile communication device to enable entry of any letter of the remainder sequence.

17. The mobile device of claim 16 further comprising a display and the processor is configured to generate the indication to perform the operation on the display by rendering a message on the display, the message to indicate the operation to perform.

18. The mobile device of claim 17, wherein the operation includes pressing a key of the keyboard.

19. The mobile device of claim 16, further comprising receiving a number at the full keyboard.

20. The mobile device of claim 19 further comprising identifying a letter associated with the number.

21. The mobile device of claim 20 further comprising
constructing partial candidate phonewords in accordance with:
the numerical beginning sequence;
the number; and
the letter associated to the number.

22. The mobile device of claim 21 further comprising:
providing the partial candidate phonewords to a comparison module; and
receiving candidate phonewords that match the partial candidate phonewords from the comparison module.

23. The mobile device of claim 22 further comprising displaying the candidate phonewords for selection.

24. The mobile device of claim 21 further comprising:
comparing the partial candidate phonewords with known phonewords to obtain candidate phonewords; and
displaying for selection, on the mobile communication device, the candidate phonewords.

25. The mobile device of claim 24 wherein comparing the partial candidate phonewords with known phonewords is preceded by accessing a database of phonewords.

26. The mobile device of claim 24 wherein:
displaying for selection is preceded by ranking the candidate phonewords to obtain ranked candidate phonewords; and
displaying for selection includes displaying, as a function of rank, the ranked candidate phonewords.

27. The mobile device of claim 26 wherein ranking the candidate phonewords includes ranking the candidate phonewords as a function of a number of calls placed to each candidate phoneword.

28. The mobile device of claim 16 wherein providing the indication to perform the operation is preceded by detecting that the numerical beginning sequence is that of a phoneword.

29. The mobile device of claim 16 wherein receiving the numerical beginning sequence is preceded by the identifying of the valid numerical beginning sequences.

30. The mobile device of claim 29 wherein identifying the valid numerical beginning sequences includes downloading the valid numerical beginning sequences from a network to which the mobile communication device is operationally connected.

* * * * *